United States Patent [19]

Burson

[11] Patent Number: 5,003,206

[45] Date of Patent: Mar. 26, 1991

[54] INTEGRAL SOLENOID AND STARTER MOTOR

[75] Inventor: Bob O. Burson, Vernon, Conn.

[73] Assignee: R. E. Phelon Company, Inc., East Longmeadow, Mass.

[21] Appl. No.: 412,010

[22] Filed: Sep. 25, 1989

[51] Int. Cl.[5] ........................ H02K 11/00; H01H 9/40; H01H 3/26

[52] U.S. Cl. ........................................ 310/23; 310/71; 335/72; 335/107; 335/201; 200/145

[58] Field of Search ............... 310/23, 71; 200/144 R, 200/145; 335/71, 72, 107, 127, 192, 196, 201

[56] References Cited

U.S. PATENT DOCUMENTS

| | | | |
|---|---|---|---|
| 4,156,217 | 5/1979 | Thornley | 335/107 |
| 4,636,599 | 1/1987 | Talir | 200/145 |
| 4,924,126 | 5/1990 | Isozumi | 310/83 |
| 4,926,078 | 5/1990 | Isozumi et al. | 310/71 |

*Primary Examiner*—Steven L. Stephan
*Assistant Examiner*—Judson H. Jones
*Attorney, Agent, or Firm*—Chapin, Neal & Dempsey

[57] ABSTRACT

Integral solenoid and starter motor having four or more poles for internal combustion engines has an electrically conductive disc carried by the armature or core of the solenoid for movement in response to energization and de-energization of the solenoid coil. Three stationary contacts of electrically conductive material are disposed in circumferentially spaced relation about the longitudinal axis of the core for sequential engagement by the movable disc. One of the stationary contacts, connected to an electrical energy source, is disposed at a position closer to the movable disc than the other stationary contacts. The other stationary contacts are connected in parallel circuits to two poles of the starter motor whereby each contact carries one-half the current supplied by the energy source. The disc is tiltably mounted on the core for making initial contact with the first stationary contact and later, with the two other contacts in response to the solenoid being energized. When the solenoid is de-energized, the movable disc breaks contact with the other stationary contacts before the first contact whereby the arcing between fixed and movable contacts is minimized.

7 Claims, 2 Drawing Sheets

INTEGRAL SOLENOID AND STARTER MOTOR

BACKGROUND OF THE INVENTION

This invention relates to solenoid coils for energizing the starting motor for internal combustion engines, and more particularly, to a switching arrangement therefor which will solve the problem of switch erosion caused by arcing across the switch contacts.

A number of prior patents including U.S. Pat. No. 3,543,047; No. 3,736,466; and No. 3,982,137 have addressed the problem of arcing across switch contacts. These patents have all utilized some type of electronic component, such as a varistor or thyristor which is utilized to increase the impedance across a set of switch contacts to reduce current flow and consequent arcing thereacross when the contacts are opened.

Another U.S. Pat. No. 4,801,909, relating to a solenoid for a starter motor, deals with the problem of solenoid contacts sticking "closed." In this patent, a tiltable contact arm is adapted to provide equipotential at one set of contacts whereby any sticking will necessarily occur at the other set of contacts. A seesaw or lever type action results in a "torque" being exerted to force the stuck contact arm free of its engagement with the fixed terminal. While this patent relates to the problem of sticking switch contacts, it does not solve the underlying problem of reducing arcing caused when a current-carrying mechanical switch is opened.

The principal object of this invention is to provide a solenoid switch for energizing a starter motor for an internal combustion engine which has a simple but effective mechanical switch arrangement for minimizing the problem of electrical arcing across the switch contacts which are adapted to "open" when the solenoid is de-energized.

Another object of this invention is to provide an integral solenoid for energizing a starter motor having at least four poles in which the switches for the motor coils are connected in parallel and in which the switch to the electrical energy source is disposed to close, or "make", before and break after the switches to the motor coils so that upon opening of the switches, electrical arcing across each switch is minimized.

A further object of this invention is to provide a solenoid of the above type in which the solenoid and motor are of compact overall size.

Yet another object of this invention is to provide a solenoid of the above type with a switch construction which utilizes a single axially movable and tiltable contact adapted to engage, in sequence, upon axial movement thereof, a fixed high potential contact and thereafter, upon tilting movement thereof, it engages other switch contacts connected to energize the starter motor and to de-energize the starter motor in reverse sequence.

The above and other objects and advantages of this invention will be more readily apparent from the following description read in conjunction with the accompanying drawings, in which.

Figure 1:
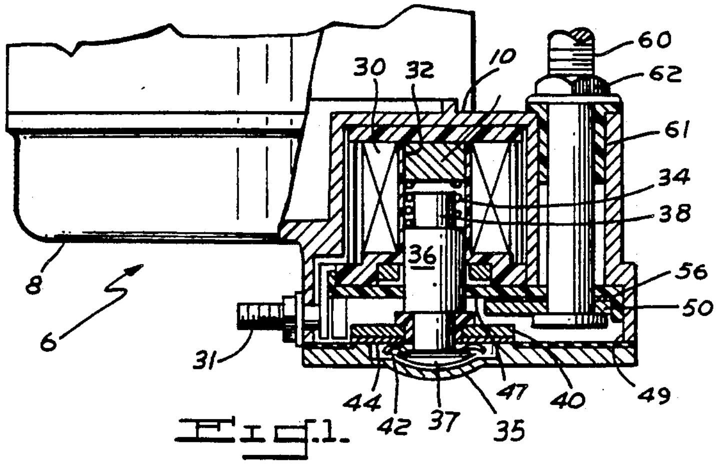
FIG. 1 is an elevation view, partly in cross-section, of a solenoid with the brush assembly of a starter motor of the type embodying this invention.
Figure 2:
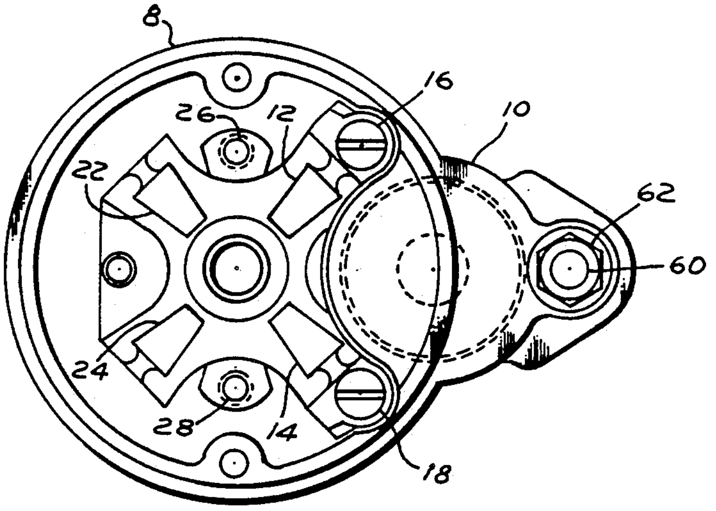
FIG. 2 is a bottom plan view of a brush assembly for the starter motor and solenoid housing.

Referring in detail to the drawings, in FIG. 1 is shown a unitary aluminum casting 6 of compact size of a brush assembly housing 8 and electromagnetic solenoid 10. It will be seen in FIG. 2, that approximately one-half of the height and one-half of the width of the solenoid mechanism 10 is contained within the envelope of the brush assembly housing 8. The brush assembly includes two brushes 12 and 14 connected to screw type terminals 16 and 18 and brushes 22 and 24 connected to ground terminals 26 and 28.

Figure 4:
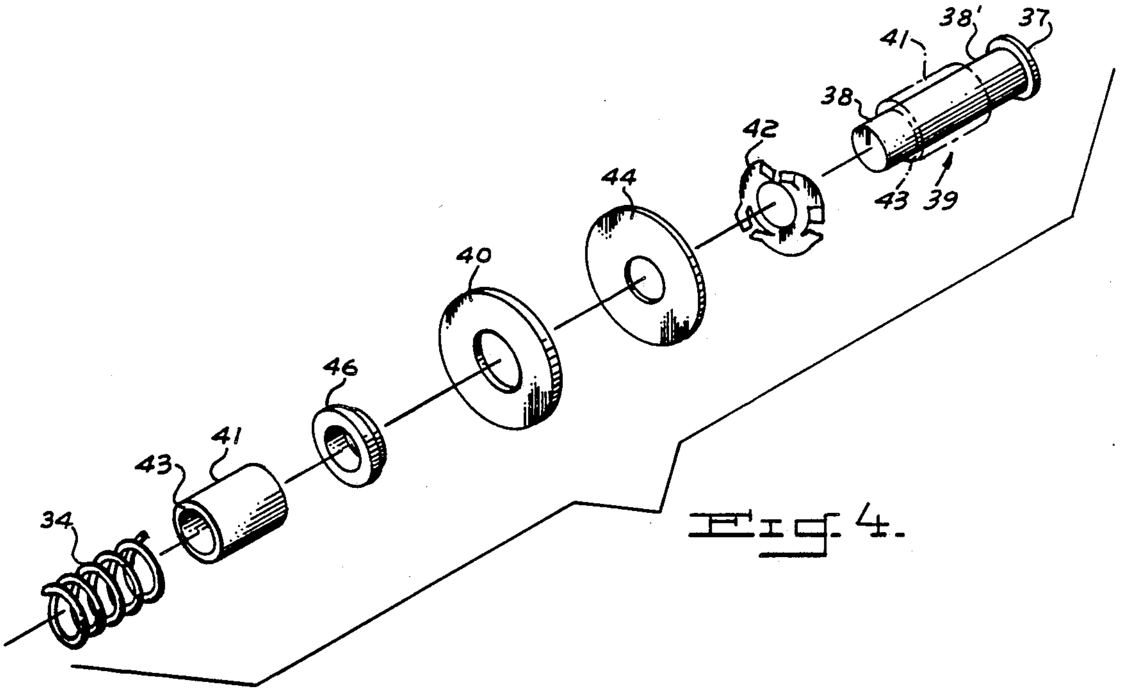
FIG. 4 is an exploded view of the solenoid core assembly.

The solenoid mechanism comprises an electrical coil 30 (FIG. 1) disposed about a cylindrical recess 32 in which is fitted a coil spring 34 and an armature core 36. The coil 30 is connected by terminal 31 to a suitable electrical energy source. The core 36 comprises a cylindrical rod of ferromagnetic material with an enlarged head 37 and an end portion 38 of reduced diameter to fit within a high energy coil spring 34. The solenoid housing includes a cover having a concave dome portion 35 adapted to accommodate the convexly curved head 37 of the core. In the embodiment shown in FIG. 4, the core assembly 36, including a circular disc 40 and a spring steel washer 42, is formed by press-fitting the shank portion 38 of a headed plunger pin 39 into a tubular sleeve 41 of a length which will leave one end portion of 38 reduced diameter and another portion 38' of reduced diameter adjacent the enlarged head 37. Prior to press-fitting the plunger pin into sleeve 41, the spring washer 42, an insulating washer 44, conductive disc 40, and plastic collar 46 are assembled on the shank of the plunger. The sleeve 41 provides an annular shoulder 43 adjacent the outer end of the coil that engages the outer end of spring 34 which will be compressed when the solenoid coil 30 is energized.

The circular disc 40 is carried adjacent the outer end portion 41 of the core 36 and is disposed in a plane perpendicular to the longitudinal axis of the core 36. The disc 40 is preferably formed of copper to provide an electrically conductive, multi-switch contact element movable longitudinally in response to energization and de-energization of the solenoid coil 30. The copper disc 40 is electrically insulated from the core 36 and spring washer 42 by the dielectric plastic collar 46 and disc 44. The copper disc 40 is tiltable to an oblique orientation relative to the logitudinal axis of the core and is held in place by the head 37 of plunger 39. The resilient spring washer 42 urges the disc to its normal orientation perpendicular to the core axis, and is compressible to provide for "over travel" of the core after the disc engages the fixed contacts and to enable the disc 40 to be tilted to complete at least three separate branches of an electrical circuit, as depicted in FIG. 5.

Figure 3:
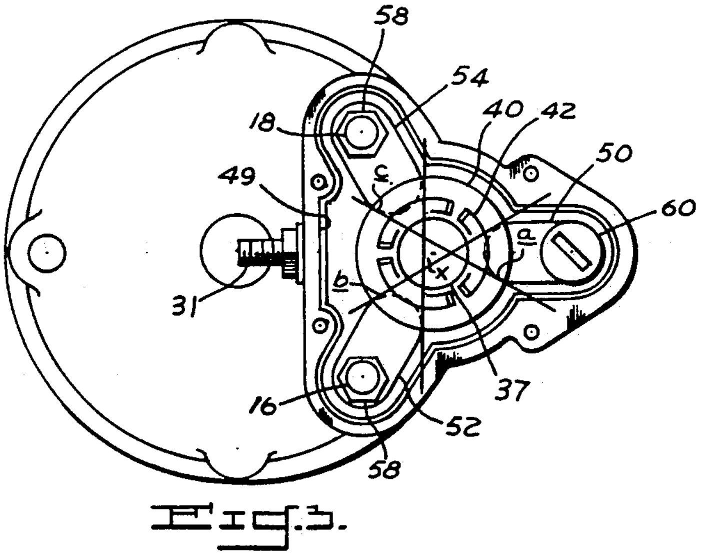
FIG. 3 is a top plan view of the solenoid with its cover plate removed to show its fixed and movable switch contacts.
Figure 5:
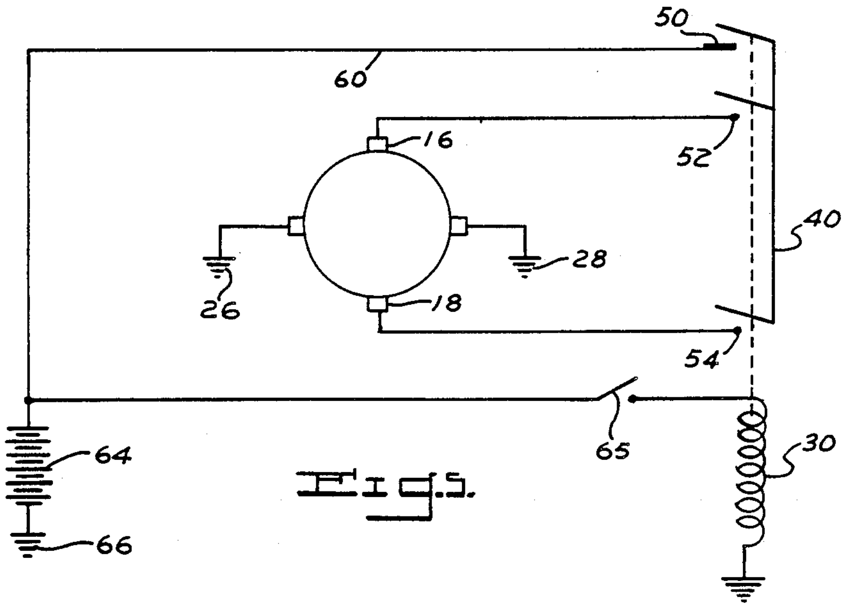
FIG. 5 is a schematic wiring diagram which illustrates the electrical connection of solenoid switches, power source and starter motor coils.

Disposed within a generally triangular recess 49 in the solenoid housing 10, are three stationary or fixed contacts or switch terminals 50, 52 and 54, best illustrated in FIGS. 3 and 5. The terminals are preferably formed of solid copper plate material. Contacts 52 and 54 are disposed against a non-conductive plastic liner 47 disposed on the lower surface of recess 49. A non-conductive shim 56 is disposed between the plate and the plastic liner whereby contact 50 is raised to a point substantially closer to the underside of disc 40 than the other contacts 52 and 54. Terminal posts 16 and 18, in the form of bolts, extend through the outer radial end portions of contacts 52 and 54 and are secured in place by nuts 58. A bolt 60 extends through the outer end portion of contact blade 50, the housing 10 and plastic sleeve 61 is secured in place by nut 62. The bolt 60 provides means for connecting the switch contact 50 to a source of electrical energy, as depicted by the battery 64 connected to ground terminal 66 and switch 65 is provided to energize the coil 30 by means of terminal 31.

The terminal contacts 50, 52 and 54 which extend radially about the core 36, include radiused inner end portions disposed in the path of axial movement of conductive disc 40 whereby the underside of the disc 40 is adapted to contact the fixed contacts in the following sequence. The level of contact 50 being higher than contacts 52 and 54 will first be engaged by the axially movable disc 40 when the solenoid coil 30 is energized. The electromagnetic force of coil 30 is sufficient to move core 36 and thus compress spring 34 and also spring washer 42. The disc 40 will thereafter be tilted about the inner edges of contact 50 to engage contacts 52 and 54 substantially at the same time. To ensure that the circular disc 40 will tilt with respect to the contact 50 to engage the three fixed contacts, the inner corner portions of the contacts adapted to be engaged by the circular disc 40 are radiused. The radius is selected such that tangent lines a, b and c (FIG. 3) between any two contacts will be offset from the center x of the disc 40 in a direction away from the third contact. Since the solenoid electromotive force is exerted along axis x, an effective moment arm acts to cause the disc 40 to be tilted toward the other contacts. As a result, the disc has a positive tendency to tilt into contact with all three contact terminals, bearing in mind that it will first contact terminal 50 and then tilt into contact with terminals 52 and 54 when the solenoid coil 30 is energized. This means that switch 50 (FIG. 5) is "closed" first and thereafter switches 52 and 54, connected in parallel, will be "closed" to energize the brushes of starter motor 10. Maximum arcing generally occurs when the starter motor is running, and the solenoid coil 30 is de-energized.

Upon de-energization of the solenoid coil 30, the disc 40 will first be tilted by spring washer 42 out of engagement with contacts 52 and 54 and, lastly, will be forcefully disengaged from contact 50 by expansion of coil spring 34. Switches 52 and 54 will "open" as the spring washer 42 tilts the disc 40 to its perpendicular orientation to the core axis. As coil spring 30 expands, the kinetic energy imparted to core 36 will cause the upper end of sleeve 41 to impact against disc 40 with sufficient momentum to break its engagement with terminal 50 and thus "open" switch 50. At that instant, since switches 52 and 54 will have already been "opened", there is no circuit connection to the motor coil load whereby there will be virtually no arcing across contact 50 and disc 40. Moreover, any arcing across each of the contacts 52 and 54 and disc 40 will be the result of only one-half of the current capacity of the load since switches 52 and 54 are connected in parallel whereby arcing will be minimized across these contacts.

Having thus described my invention, what is claimed is:

1. Solenoid for energizing a starter motor of an internal combustion engine comprising a ferromagnetic core axially movable in response to the energization and de-energization of an electrical coil disposed about the core, an electrically conductive disc disposed on said core and carried thereby, said disc being tiltable with respect to the axis of said core, a plurality of stationary switch contacts disposed in the path of movement of said disc to be engaged thereby, a first of said contacts being connected to an electrical energy source, each of other of said contacts being connected in parallel to energize different windings of said starter motor, the first contact being disposed in closer proximity to said disc when the solenoid is not energized so that when the solenoid is energized, the disc will engage said first contact before the other contacts and will be disengaged from said other contacts before the first contact when the solenoid is de-energized whereby the parallel circuits to the motor coils will be broken before the first circuit to minimize arcing across said contacts.

2. Solenoid for energizing a starter motor, as set forth in claim 1, in which said solenoid and starter motor are disposed in an integral housing characterized by the solenoid being longitudinally and laterally coextensive with a portion of the starter motor housing.

3. Solenoid for energizing a starter motor, as set forth in claim 1, in which said fixed contacts are circumferentially spaced about the periphery of the solenoid core and in which said disc includes peripheral portions adapted to engage the fixed contacts by axial and tiltable movement thereof.

4. Solenoid for energizing a starter motor, as set forth in claim 3, in which said disc is copper and is insulated from the ferromagnetic core, said stationary contacts including radiused end portions disposed in the path of axial movement of the copper disc to enable tilting of the disc into engagement with all the stationary contacts even though the opposed surfaces of the disc and stationary contacts are spaced apart at different distances.

5. Solenoid for energizing a starter motor, as set forth in claim 4, in which a spring washer, insulated from said disc, releasably urges the disc to a position perpendicular to the core axis and in which a shim is disposed under said first stationary contact so that its distance relative to the disc is less than the corresponding dimension to the other stationary contacts.

6. Solenoid for energizing a starter motor, as set forth in claim 5, in which said other stationary contacts are secured in place by electrically conductive fasteners which serve as means for connecting the other contacts to the coils of the starter motor.

7. Solenoid for energizing a starter motor, as set forth in claim 6, in which said contacts comprise at least three elongated copper discs, equally spaced about the periphery of the core with their longer dimension in a radial direction, the radiused inner end portion of said contacts being such that a tangent extending between the radiused edges of any two contacts will be offset from the geometric center of the disc in a direction away from the third contact to provide a moment arm for causing tilting of the disc into contact with all said contacts at the same time.

* * * * *